US005965044A

United States Patent [19]

Clarke et al.

[11] Patent Number: 5,965,044

[45] Date of Patent: Oct. 12, 1999

[54] LASER PERFORATING PROCESS FOR PRODUCING AN ACOUSTICAL AND STRUCTURAL MICROPOROUS SHEET

[75] Inventors: James A. Clarke, Greenlawn; Charles A. Parente, Oyster Bay, both of N.Y.

[73] Assignee: Northrop Grumman Corporation, Los Angeles, Calif.

[21] Appl. No.: 08/910,945

[22] Filed: Aug. 14, 1997

[51] Int. Cl.[6] .......... B23K 26/00

[52] U.S. Cl. .......... 219/121.71

[58] Field of Search .......... 219/121.71, 121.7; 156/98; 29/428

[56] References Cited

U.S. PATENT DOCUMENTS

| | | | |
|---|---|---|---|
| 4,032,743 | 6/1977 | Erbach et al. | 219/121 |
| 4,092,515 | 5/1978 | Joslin et al. | 219/121 |
| 4,288,679 | 9/1981 | La Rocca | 219/121.71 |
| 4,458,134 | 7/1984 | Ogle | 219/121.7 |
| 4,850,093 | 7/1989 | Parente | 29/428 |
| 4,857,698 | 8/1989 | Perun | 219/121.7 |
| 4,870,244 | 9/1989 | Copley et al. | 219/121.7 |
| 5,246,530 | 9/1993 | Bugle et al. | 156/643 |
| 5,653,836 | 8/1997 | Mnich et al. | 156/98 |
| 5,741,456 | 4/1998 | Ayrton | 219/121.71 |

*Primary Examiner*—Geoffrey S. Evans

*Attorney, Agent, or Firm*—Terry J. Anderson; Karl J. Hoch, Jr.

[57] ABSTRACT

A microporous sheet having both acoustical and structural functionality and a process for producing the sheet. Construction of the sheet requires, first of all, providing a sheet capable of functioning as a structural element of a component. A laser device capable of producing a free electron laser beam is provided, and the free electron laser beam is directed to a surface of the sheet to penetrate the sheet at a plurality of sites and thereby form a plurality of apertures. These apertures are generally uniformly dispersed and of a size and number sufficient to enable the sheet to function as an acoustical noise suppressor while retaining capability of functioning as a structural element. Use of free electron laser technology permits formation of smooth-walled, circular or non-circular apertures tailored to exact geometry specifications controlled to a nanometer in size, and produces a microporous sheet having structural functionality while meeting acoustic requirements with clean, unclogged apertures and with low friction-to-surface and/or boundary-layer control airflow.

16 Claims, 1 Drawing Sheet

LASER PERFORATING PROCESS FOR PRODUCING AN ACOUSTICAL AND STRUCTURAL MICROPOROUS SHEET

FIELD OF THE INVENTION

This invention relates in general to microporous metallic and non-metallic sheets, and in particular to a microporous sheet and a process for its production and use where the sheet has both acoustical and structural functionality by having formed therethrough a plurality of apertures of a size and number sufficient to enable the sheet to function as an acoustical noise suppressor while retaining capability of functioning as a structural element.

BACKGROUND OF THE INVENTION

Certain elements of manufacture require both acoustical and structural qualities in particular applications. One example of such a requirement is found in a jet engine housing for an airplane. In particular, an engine housing must function as both a noise suppressor and a structurally sound encasement of the engine therewithin disposed. This dual task now is accomplished by employing two-sheet fabrication comprising a porous first sheet or "skin" for acoustical control and a second perforated skin for structural stability. Both functions cannot be accomplished by present porous-sheet construction since normal laser-drilled or chemically-etched apertures yield sheets that are poor in structural and fatigue strength and thus require a second perforated sheet for structural capability. Specifically, apertures formed by normal laser drilling or chemical etching have rough edges and cannot be tailored to indicated geometric and size characteristics for particular applications, and the sheets so constructed experience poor fatigue life and structural integrity. Further, because of the limited quality and geometric choice of these prior-art apertures, friction-to-surface values can be relatively high which can cause clogging and resultant airflow disruption.

In view of the above considerations, it is apparent that a need is present for a metallic or non-metallic sheet having both acoustical and structural functionality, and for a process for producing such a sheet. Accordingly, a primary object of the present invention is to provide an acoustically and structurally functional porous sheet and a process for its formation.

Another object of the present invention is to provide such a sheet wherein a plurality of apertures therethrough are formed by a free-electron laser beam.

Yet another object of the invention is to provide such a sheet wherein the plurality of apertures are of a size and number sufficient to enable the sheet to function as an acoustical noise suppressor while retaining capability of functioning as a structural element.

Still another object of the present invention is to provide a jet engine housing constructed of a single sheet of the inventive acoustically and structurally functional porous sheet defined herein.

These and other object of the present invention will become apparent throughout the description thereof which now follows.

SUMMARY OF THE INVENTION

The present invention is a microporous metallic or non-metallic sheet having both acoustical and structural functionality and a process for producing the sheet. Construction of the microporous sheet comprises, first of all, providing a sheet capable of functioning as a structural element of a component. A laser device capable of producing a free electron laser beam is provided, and the free electron laser beam is directed to a surface of the sheet to penetrate the sheet at a plurality of sites and thereby form a plurality of apertures. These apertures are generally uniformly dispersed and of a size and number sufficient to enable the sheet to function as an acoustical noise suppressor while retaining capability of functioning as a structural element. Use of free electron laser technology permits formation of smooth-walled, circular or non-circular apertures tailored to exact geometry specifications controlled to a nanometer in size. This methodology results in the production of a microporous sheet having structural functionality while meeting acoustic requirements with clean, unclogged apertures and with low friction-to-surface and/or boundary-layer control airflow.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
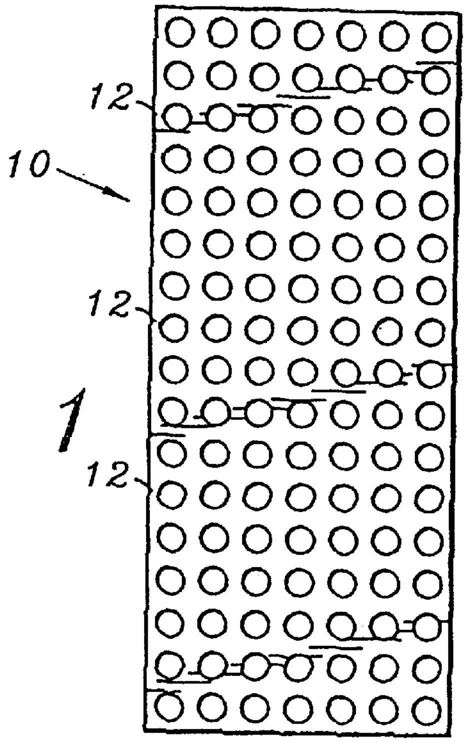
FIG. 1 is an enlarged top plan view of a portion of a microporous metal sheet formed by free electron laser beam treatment.
Figure 2:
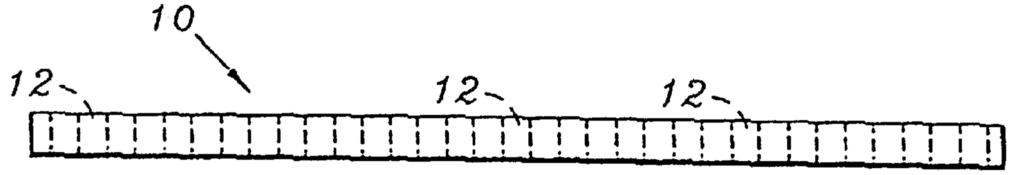
FIG. 2 is an enlarged side elevation view of the sheet of FIG. 1.

Referring to FIGS. 1 and 2, a microporous titanium sheet 10 is shown. While the sheet 10 of the preferred embodiment is titanium, it is to be recognized that other metallic or non-metallic sheets can be employed according to the present invention so long as required noise suppression and structural strength are appropriate to specific applications. The sheet 10 has a plurality of apertures 12 formed by a free electron laser beam emitted from a continuous electron beam accelerator device. A conventional fixturing tool (not shown) is employed to secure the metal sheet 10 and control movement of the beam device while forming the apertures 12 to be dispersed generally uniformly through the sheet 10. The apertures 12 here formed are generally circular and have a diameter of from about 0.003 inch to about 0.025 inch. Non-circular apertures having a cross-sectional area of from about $7\times10^{-6}$ square inch to about $5\times10^{-4}$ square inch can be produced by simply directing the beam device in the aperture pattern desired.

As earlier noted, the metal sheet 10 must be capable of functioning as a structural element of a component. By forming the small apertures 12 generally uniformly throughout the sheet 10, the sheet 10 becomes microporous and thereby acquires acoustical functionality. To maintain structural stability of the sheet 10, however, the apertures 12 must be of a size and number that will not interfere with such stability. In the titanium sheet 10 here shown and having a thickness of about 0.015 inch, from about 3% to about 12% open area can be provided without significantly jeopardizing structural functionality while still achieving noise suppression capabilities. Non-limiting examples of other metals as well as non-metallic materials having the capability of providing both acoustical and structural qualities when treated according to the principles of the present invention include aluminum, steel, nickel, and reinforced polymers such as graphite-epoxy, glass-epoxy and carbon-carbon.

Figure 3:
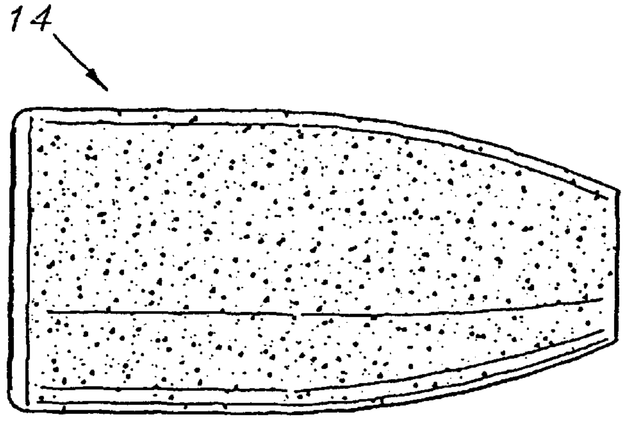
FIG. 3 is a side elevation view of a jet engine housing formed from the metal sheet as defined in FIG. 1.

Referring to FIG. 3, a jet engine housing 14 constructed of a titanium metal sheet 10 as described for FIGS. 1 and 2 is shown. As earlier reported, prior art housings are constructed of two sheets, with one thereof providing noise suppression and the other providing structural integrity. Conversely, the housing 14 of the present invention is constructed of one sheet that provides both structural and noise suppression functionalities to thereby accomplish greater efficiencies in the construction, maintenance, and weight control aspects of component structures.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A process for producing a microporous sheet having both acoustical functionality and single-entity structural functionality, the process comprising directing a free electron laser beam to a surface of a sheet capable of functioning as a self-supporting structural element upon multiple perforation to perforate the sheet at a plurality of sites and thereby form a plurality of generally uniformly dispersed apertures of substantially constant cross section there through and of a size and number sufficient to enable the sheet to function as an acoustical noise suppressor as well as a structural element.

2. A microporous sheet as claimed in claim 1 wherein the apertures are generally circular in shape.

3. A microporous sheet as claimed in claim 2 wherein the apertures have a diameter of between about 0.003 inch. and about 0.025 inch.

4. A microporous sheet as claimed in claim 1 wherein the apertures have a cross-sectional area of from about $7\times10^{-6}$ square inch. to about $5\times10^{-4}$ square inch.

5. A microporous sheet as claimed in claim 4 wherein the apertures create from about 3% to about 12% open area in the sheet.

6. A microporous sheet as claimed in claim 1 wherein the apertures create from about 3% to about 12% open area in the sheet.

7. A microporous sheet as claimed in claim 6 wherein the sheet is constructed of material selected from the group consisting of titanium, aluminum, steel, nickel, and reinforced polymers.

8. A microporous sheet as claimed in claim 1 wherein the sheet is constructed of material selected from the group consisting of titanium, aluminum, steel, nickel, and reinforced polymers.

9. A process for producing a jet engine housing having both acoustical and structural functionality, the process comprising:

a) directing a free electron laser beam to a surface of a sheet capable of functioning as a self-supporting structural element upon multiple perforation to perforate the sheet at a plurality of sites and thereby form a plurality of generally uniformly dispersed apertures of substantially constant cross section there through and of a size and number sufficient to enable the sheet to function as an acoustical noise suppressor as well as a structural element; and b) forming the sheet into a jet engine housing element.

10. A process as claimed in claim 9 wherein the apertures are generally circular in shape.

11. A process as claimed in claim 10 wherein the apertures have a diameter of between about 0.0003 inch. and about 0.025 inch.

12. A process as claimed in claim 9 wherein the apertures have a cross-sectional area of from about $7\times10^{-6}$ inch to about $5\times10^{-4}$ square inch.

13. A process as claimed in claim 12 wherein the apertures create from about 3% to about 12% open area in the metal sheet.

14. A process as claimed in claim 9 wherein the apertures create from about 3% to about 12% open area in the metal sheet.

15. A process as claimed in claim 14 wherein the sheet is constructed of material selected from the group consisting of titanium, aluminum, steel, nickel, and reinforced polymers.

16. A process as claimed in claim 9 wherein the sheet is constructed from the group consisting of titanium, aluminum, steel, nickel, and reinforced polymers.

* * * * *